United States Patent
Schweiger et al.

(10) Patent No.: US 6,351,206 B1
(45) Date of Patent: Feb. 26, 2002

(54) ANTITHEFT PROTECTION SYSTEM FOR A MOTOR VEHICLE

(75) Inventors: Jürgen Schweiger, Regensburg; Maximilian Löffler, Bernhardswald, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/112,974

(22) Filed: Jul. 9, 1998

(30) Foreign Application Priority Data

Jul. 9, 1997 (DE) .......................... 197 29 402

(51) Int. Cl.$^7$ ................................ H04B 1/00
(52) U.S. Cl. ............... 340/5.64; 340/10.34; 307/10.3; 307/10.6; 70/278.1
(58) Field of Search ............... 340/825.31, 825.32, 340/5.61, 64, 10.34, 5.6, 825.72, 825.69, 10.3; 307/10.3, 8, 10.2, 5; 235/449; 70/277, 278.1

(56) References Cited

U.S. PATENT DOCUMENTS

| 4,250,533 A | 2/1981 | Nelson |
| 5,491,470 A | 2/1996 | Veligdan |
| 5,841,363 A | * 11/1998 | Jakob et al. ........... 340/825.31 |

FOREIGN PATENT DOCUMENTS

| DE | 41 23 666 A1 | 7/1992 |
| DE | 44 34 587 A1 | 4/1995 |
| DE | 44 34 655 A1 | 4/1995 |
| DE | 195 39 852 C1 | 10/1996 |
| EP | 0 115 747 A1 | 8/1984 |

* cited by examiner

Primary Examiner—Michael Horabik
Assistant Examiner—William L. Bangachon
(74) Attorney, Agent, or Firm—Herbert L. Lerner; Laurence A. Greenberg; Werner H. Stemer

(57) ABSTRACT

An energy coil together with an IR receiver form a mechatronic component of an ignition lock. The component is disposed in a receptacle of the ignition lock such that, with the ignition key inserted the component, it is disposed in close proximity to an energy coil and an IR transmitter of the ignition key and it is aligned with the latter.

8 Claims, 4 Drawing Sheets

ANTITHEFT PROTECTION SYSTEM FOR A MOTOR VEHICLE

BACKGROUND OF THE INVENTION

1. Field of the Invention

The invention relates to an antitheft protection system for a motor vehicle, in particular to a steering/ignition lock. The system includes a key with an energy-receiving unit and a data-transmitting unit, and a lock with an energy-transmitting unit and a data-receiving unit. The data-receiving unit is connected to an evaluation unit which checks the received data for their authorization and releases a locking element after the entry authorization has been verified.

2. Description of the Related Art

A prior art antitheft protection system (German published non-prosecuted patent application DE 44 34 587 A1) has an ignition key which is inserted into an ignition lock. The insertion causes energy to be transmitted from the lock to the key. In response, the key generates a code signal and transmits it back to the lock. The code signal is evaluated and an immobilizer is disengaged if the authorization is verified.

Moreover, an electromagnetic lock is unlocked, as a result of which the key can be turned in the lock. The steering wheel lock is mechanically disengaged by turning the key.

In that antitheft protection system, the code signal is transmitted from the key to the lock by means of IR radiation. An optical fiber is arranged in the lock which guides the code signal to a more remote IR receiver. The mounting of the optical fiber is very complicated and, moreover, the optical fiber is susceptible to mechanical stress.

Another antitheft protection system for a motor vehicle has a key which transmits IR signals to a lock. However, in that case the lock is not the ignition lock but a receptacle on whose rear end an IR receiver is arranged. With the key inserted, the IR transmitter of the key is arranged close to the IR receiver of the lock. A coil is arranged around the lock by means of which energy is transmitted from the lock to the key so that the code signal can be triggered. There, as well, the lock is very complicated in its construction, since the coil is wound around the lock. Furthermore, the magnetic coupling between the coil of the lock and the coil of the key is quite limited.

SUMMARY OF THE INVENTION

It is accordingly an object of the invention to provide an antitheft protection system for a motor vehicle, which overcomes the above-mentioned disadvantages of the prior art devices and methods of this general type and which is of simple design and by means of which it is possible effectively to transmit both energy and data from a lock to a key, or vice versa.

With the foregoing and other objects in view there is provided, in accordance with the invention, an antitheft protection system for a motor vehicle, comprising:

a key having an energy-receiving unit and a data-transmitting unit;

a lock having an energy-transmitting unit and a data-receiving unit, an evaluation unit connected to the data-receiving unit for checking a data signal received by the data-receiving unit with regard to an authorization and for releasing a locking element if the authorization can be verified;

the energy-transmitting unit and the data-receiving unit of the lock being constructed as a single component disposed substantially centrally in the lock; and the key having an end carrying the energy-receiving unit and the data-transmitting unit of the key, the end being adapted to be inserted into the lock, whereby the energy-receiving unit and the data-transmitting unit of the key, and the energy-transmitting unit and the data-receiving unit of the lock are disposed in close proximity to one another and approximately aligned with one another.

In other words, a transmitting and receiving unit is constructed in the lock as a single component by means of which energy can be inductively emitted and data can be received by the key. The transmitting and receiving unit is arranged in this case in the middle of the lock, with the result that with the key inserted the transmitting and receiving unit of the lock and a transmitting and receiving unit of the key are arranged close to one another.

In accordance with an added feature of the invention, a data-receiving unit is disposed in the key, and a data-transmitting unit is disposed in the lock, and wherein the data-receiving unit in the key and the data-transmitting unit in the lock, together with the data-transmitting unit of the key and the data-receiving unit in the lock, are adapted to carrying out bidirectional data transmission between the key and the lock.

In accordance with an additional feature of the invention, the data-transmitting unit in the lock and the energy-transmitting unit and the data-receiving unit are constructed as a single component.

In accordance with a further feature of the invention, the locking element is an electromagnetic locking element for selectively locking and releasing a steering lock and/or for selectively engaging and disengaging an immobilizer of a motor vehicle.

In accordance with again another feature of the invention, the lock is an ignition lock and the key is an electronic ignition key of a motor vehicle.

In accordance with a concomitant feature of the invention, the energy-transmitting unit and the energy-receiving unit each are a coil, the data-transmitting units are phototransistors, and the data-receiving units are IR diodes.

Thus, bidirectional data communication can take place using the antitheft protection system if the lock transmits not only energy signals but also data signals. For this purpose, the lock has a data-transmitting unit which is also integrated in the component. A steering-wheel lock of the motor vehicle is disengaged not mechanically but via an electromagnetic blocking device by means of a code signal. In this case, the lock is a steering lock or ignition lock and the key is an electronic ignition key. The transmitting and receiving unit is constructed as an optotransmitter and optoreceiver for the purpose of reliable data transmission. The lock and the key each have a coil for the purpose of inductive energy transmission.

Other features which are considered as characteristic for the invention are set forth in the appended claims.

Although the invention is illustrated and described herein as embodied in an antitheft protection system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
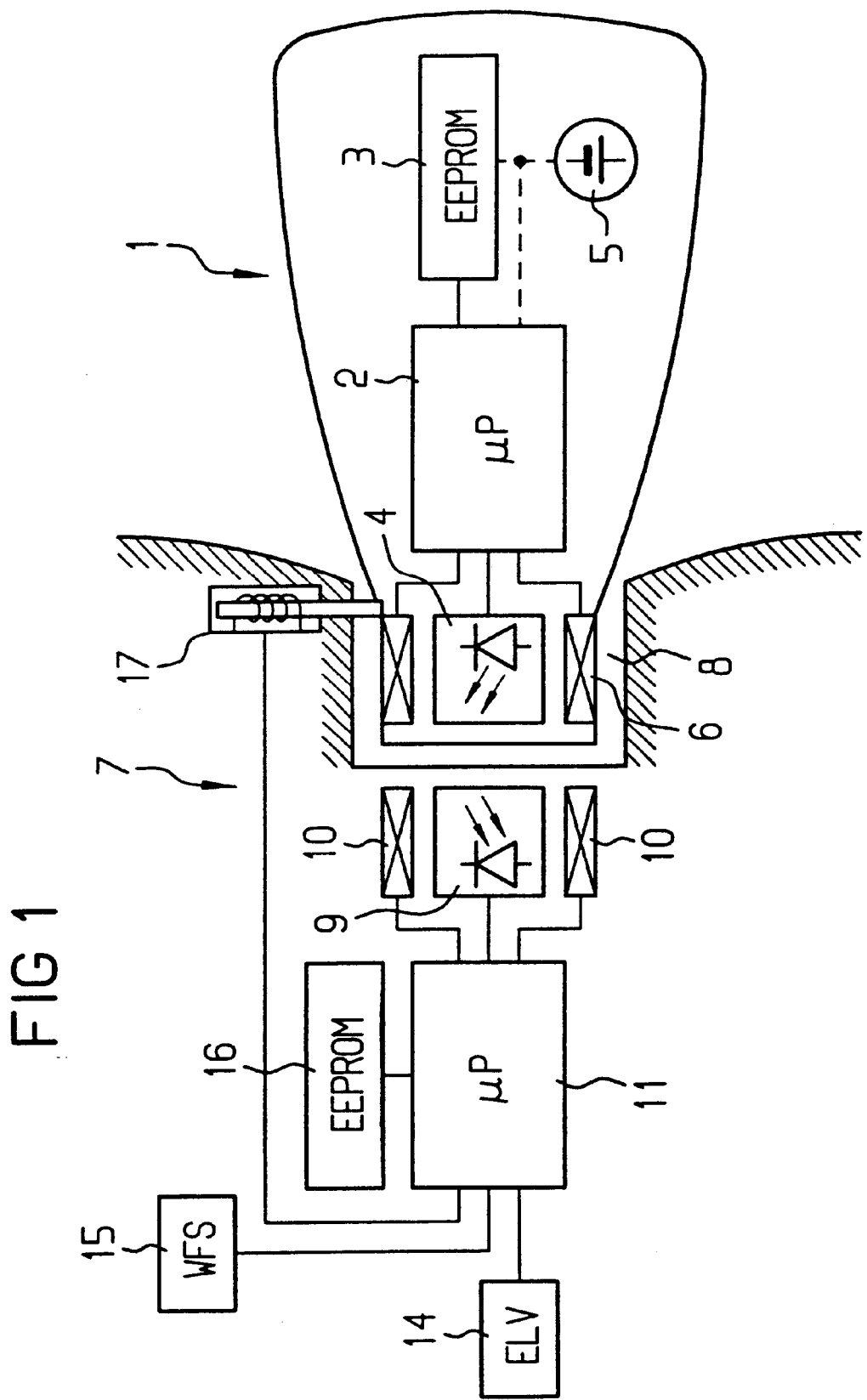
FIG. 1 is a schematic block diagram of the antitheft protection system according to the invention.

Referring now to the figures of the drawing in detail and first, particularly, to FIG. 1 thereof, there is seen an electronic key 1 without any mechanical coding. The key 1 verifies its authorization with the aid of a binary code signal generated in it.

For this purpose, the key 1 has a control unit 2 ($\mu$P) which is connected to a data memory 3 (EEPROM). The control unit 2 can generate the code signal with the aid of person-specific and/or vehicle-specific data stored in the data memory 3, by means of a stored mathematical algorithm and, if appropriate, with the aid of received data. The code signal is emitted in a wireless fashion via a transmitting unit, here preferably an infrared transmitter (IR transmitter 4).

The key 1 can have an energy store 5 (represented by dashes in FIG. 1). The energy store 5 is, however, only optional, since the key 1 can also receive its energy inductively (via a magnetic field) via a coil 6 constructed as a receiving unit. The energy store 5 can, however, also serve as a buffer for the received energy.

The IR transmitter 4 is arranged in the front region (at the tip of the key 1) on the end side, approximately in the middle. The coil 6 is wound around the IR transmitter 4. The front region of the key 1 is inserted into a lock 7.

The lock 7 has a corresponding key receptacle or socket 8 for the key 1. At the end face of the socket 8 there are disposed an infrared (IR) receiver 9 (receiving unit), and a coil 10 (transmitting unit). The coil 10 and the IR receiver 9 are connected as transmitting and receiving units to a central control and evaluation unit 11 ($\mu$P) which controls the transmission and reception of energy and data and outputs appropriate control signals to connected security units such as an electronic steering lock 14, electronic immobilizer 15, door locks, ignition-starter switch, etc.

Upon triggering of an authentication operation, current flows through the lock-side coil 10 and, as a result, a magnetic field is produced. The magnetic field also penetrates the key-side coil 6 when the key 1 is inserted in the lock 7. Consequently, a voltage is induced in the key-side coil 6. In this way, energy is transmitted inductively from the lock 7 to the key 1. The larger the magnetic coupling of the two coils 6, 7 (i.e., the closer they are arranged relative to one another in a suitable position), the more effective is the transmission of energy.

When the code signal generated in the key 1 is received by the lock 7, it is evaluated in the control and evaluation unit 11. For the purpose of evaluating the code signal, the control and evaluation unit 11 is connected to a data memory 16 in which an expected desired code signal is stored. The desired code signal can also be generated in the control and evaluation unit 11 by means of the same algorithm as in the key 1.

The control and evaluation unit 11 is, moreover, connected to items of equipment acting as security units, such as the immobilizer 15 and the steering lock 14. If the code signal has proved to be authorized (successful authentication), then the immobilizer 15 is disengaged and the steering lock 14 is unlocked. The motor vehicle can thereafter be used.

When the key 1 is inserted into the lock 7, it is initially incapable of being turned. As soon as the lock 7 recognizes that the key 1 is inserted, energy is transmitted inductively to the key-side coil 6 via the lock-side coil 10. The key 1 uses the energy to generate its code signal. The code signal is thereupon sent back to the lock 7 via the key-side IR transmitter 4.

The lock-side IR receiver 9 receives the code signal and passes it on for evaluation to the control and evaluation unit 11. If the code signal is recognized as authorized in the lock 7, an electromagnetic locking device 17 is actuated and permits the key 1 to turn. Subsequently, the steering lock 14 is unlocked and the immobilizer 15 is disengaged.

In order for the transmission of data and energy to be as effective as possible, the IR transmitter 4 in the key 1 and the IR receiver 9 in the lock 7 are each arranged in the middle in such a way that, with the key 1 inserted, the IR transmitter 4 and the IR receiver 5 are situated directly opposite one another (the two are then oppositely aligned). The two coils 6, 10 are then likewise arranged close to one another and aligned relative to one another. The magnetic field lines of the lock-side coil 10 then extend essentially transversely to the area turns of the key-side coil 6. The magnetic flux of the lock-side coil 10 is thus led through the key-side coil 6 as effectively as possible. Consequently, a voltage which is as large as possible and is used as energy for conditioning the code signal is induced in the key-side coil 6.

Figure 2:
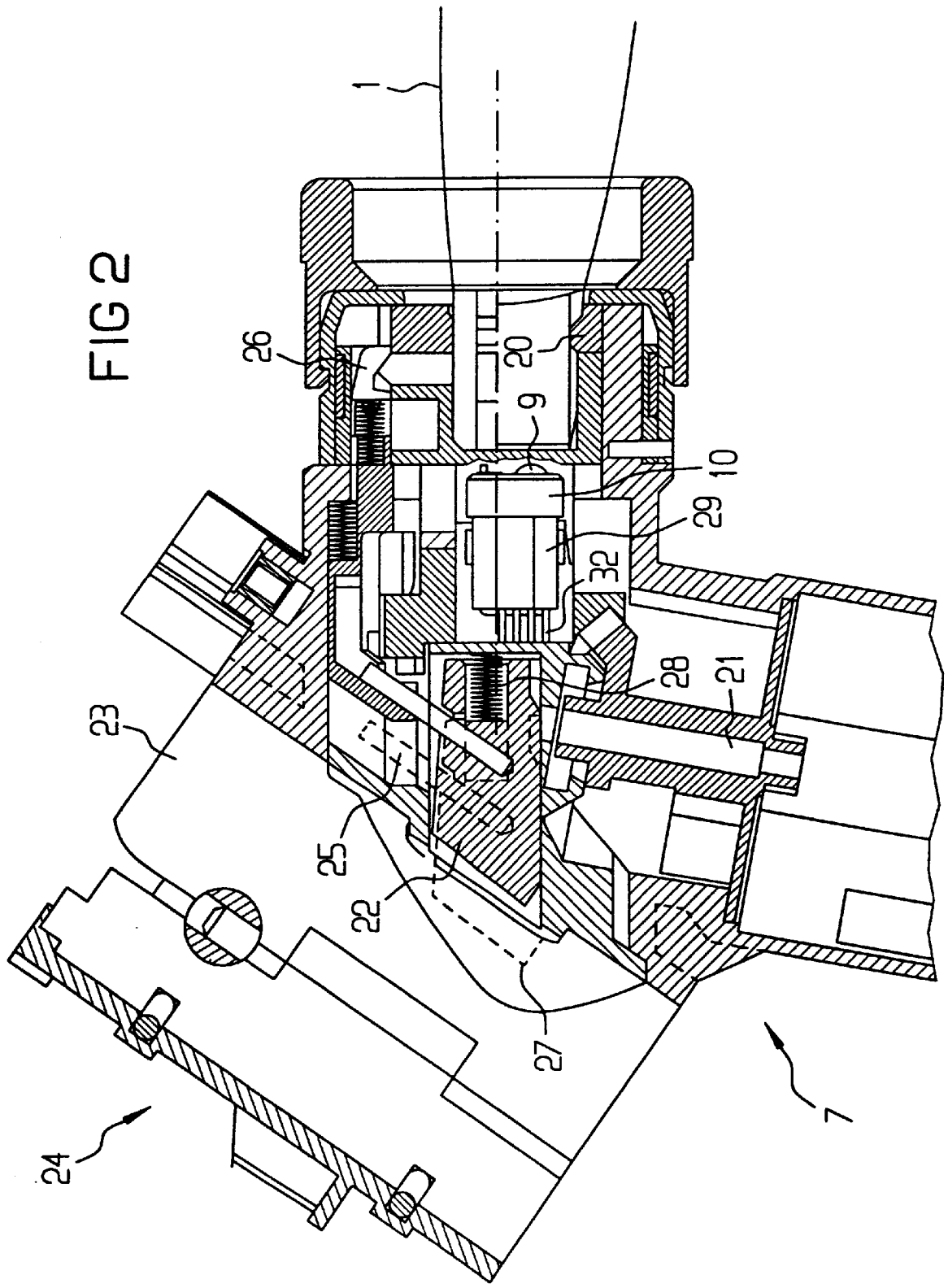
FIG. 2 is a partial sectional view taken through a lock of the antitheft protection system according to the invention.

With reference to FIG. 2, a key arresting device 20 is disposed in the receptacle 8 of the lock 7. The key arresting device 20 is connected to a non-illustrated switch. When the key 1 is inserted into the lock 7, the key 1 firstly latches in the key-arresting device 20. The switch is actuated in this case by the switch-arresting device 20. Consequently, a signal is generated which activates the coil 10 of the lock 7 to transmit energy to the key 1.

As soon as the key 1 receives energy via its coil 6, the code signal is generated and is transmitted back to the IR receiver 9 in the lock 7 via the IR transmitter 4 in the key 1. The code signal is evaluated in the lock 7. If the code signal proves to be authorized, a turning shaft 21 is released electromagnetically. The turning shaft 21 locks a locking bolt 22 beforehand and releases the movement of the locking bolt 22 after authentication.

The key 1 can now be turned in the lock 7. As a consequence of the turning of the key 1, the locking bolt 22 is extracted via the turning shaft 21 from a casing tube 23 of the steering column 24. The steering column 24 can thus be turned (the locking bolt 22 in FIG. 2 is represented in this position). Consequently, the steering wheel is no longer locked and can be turned as required. The locking bolt 22 is pushed into or out of the steering column 24 with the aid of a driver 25 which is driven by the turning shaft 21.

Subsequently, various electric contacts of the control and evaluation unit 11 are switched in depending on the angular position of the key 1, that is to say diverse items of equipment are electrically connected to the vehicle battery. Initially, accessories such as a radio are supplied with energy by turning the key 1. As turning proceeds, the ignition switch is switched on (also denoted as KL15). In the end position, current flows through the starter, and the motor vehicle engine is started.

If the code signal has proved to be authorized, the immobilizer 15 is also disengaged. The immobilizer 15 can be included in an engine control unit which keeps the engine operating when the code signal is authorized. If the code signal is not authorized, the engine is turned off. Other locking elements, such as a valve in the fuel feed, a switch for switching on the ignition etc. can also be used as immobilizer 15. The immobilizer 15 is, however, not released until the code signal is authorized.

When the key 1 is turned back into its initial position after the vehicle has been used, the engine and ignition are switched off, as are the further accessories. As soon as the key 1 is withdrawn from the block 7, a so-called sliding block 26 is actuated. This sliding block 26 causes the locking bolt 22 to be pressed automatically into a cutout 27 in the steering column 24 so that the steering is locked. The locking bolt 22 is pushed in this case into the steering column 24 by the spring force of a spring 28 so that a turning motion of the steering column 24 is also reliably blocked.

In this way, the steering lock 14 is automatically locked as soon as the key 1 is withdrawn. As soon as the key 1 is inserted into the block 7 again, authentication occurs anew—starting with the transmission of energy to the key 1—and, subsequently, the code signal is transmitted back from the key 1 to the lock 7. The code signal is rechecked in the lock 7 before the steering lock 14 and the immobilizer 15 are unlocked.

Figure 3:
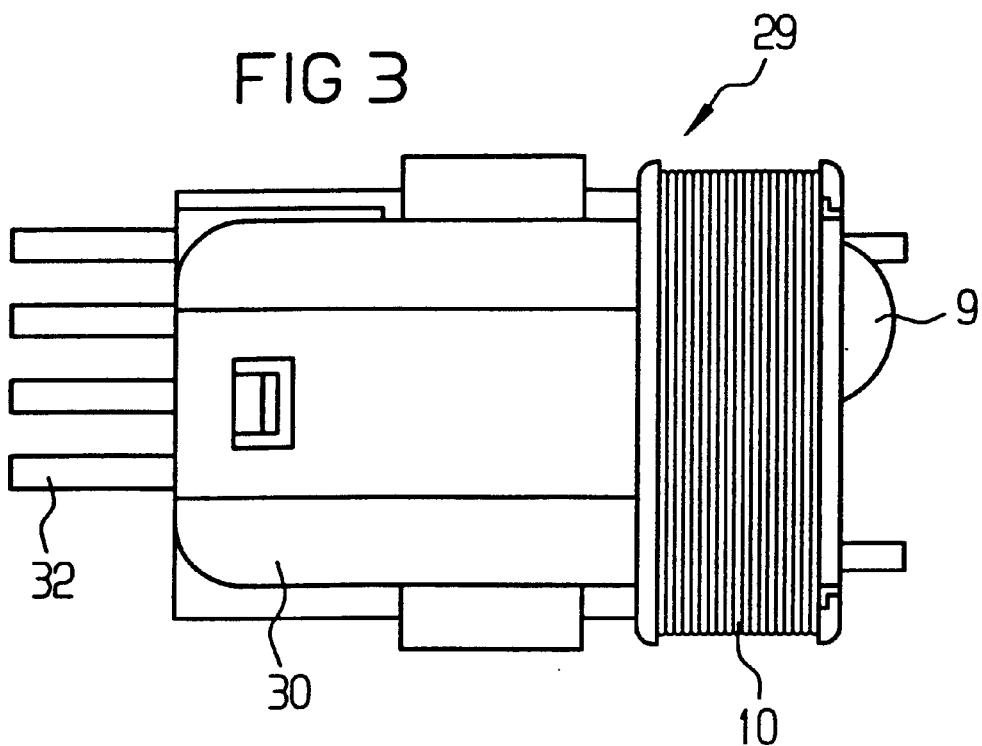
FIG. 3 is a side view of a lock-side transmitting and receiving unit.
Figure 4:
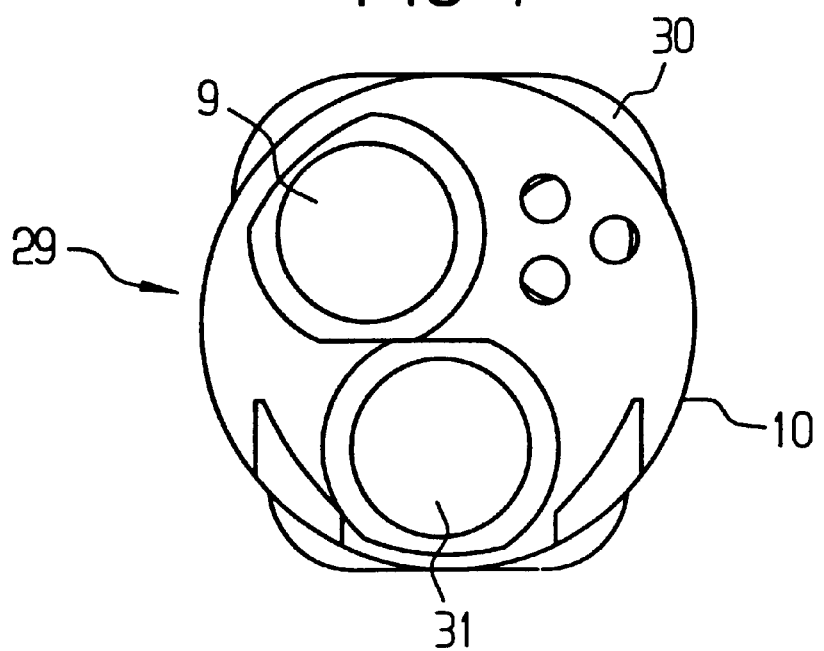
FIG. 4 is a plan view of the transmitting and receiving unit according to FIG. 3.

So that data and energy can be transmitted as effectively as possible, the coil 10 and the IR receiver 9 are designed as a compact component 29. This is best seen from FIGS. 3 and 4. Such components 29 are also denoted as mechatronic components. The component 29 has a housing 30 in which the IR receiver 9 is constructed in an integrated fashion as an IR diode. The small external shape of the component 29 saves much space when the component 29 is mounted in the lock 7.

In addition to the IR receiver 9, it is also possible for an IR transmitter 31 (FIG. 4) to be included in the component 29. As a result, the lock 7 can both transmit data to the key 1 and also receive data from the key 1 (bidirectional data transmission between key 1 and lock 7).

The coil 10 is wound around the housing 30 in the region of the IR receiver 9. The coil 10 can also be disposed in the housing 30. However, the housing 30 then may only be produced from a non-magnetic material. It is essential that the IR receiver 9 and an IR transmitter 31 which is possibly present are arranged inside the coil 10 (specifically inside the area turns). A non-illustrated ferromagnetic coil in which the magnetic field density is increased can also be disposed inside the coil 10. This has the advantage that the current required to generate the magnetic field can be substantially reduced.

Electric connections 32 for the coil 10 and for the IR receiver 9 as well as for the IR transmitter 31 possibly present project from the housing 30. When the component 29 is mounted in the lock 7, the connections 32 are connected to the central control and evaluation unit 11 of the lock 7 via electric lines.

Figure 5:
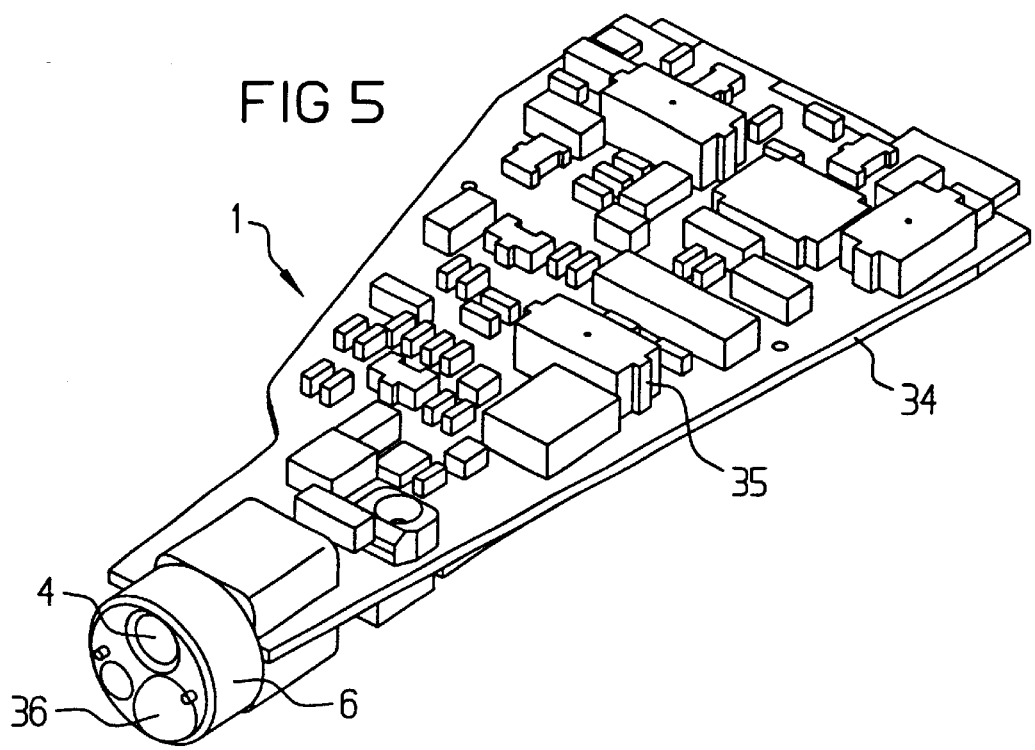
FIG. 5 is a perspective view of a first exemplary embodiment of a key for the antitheft protection system.
Figure 6:
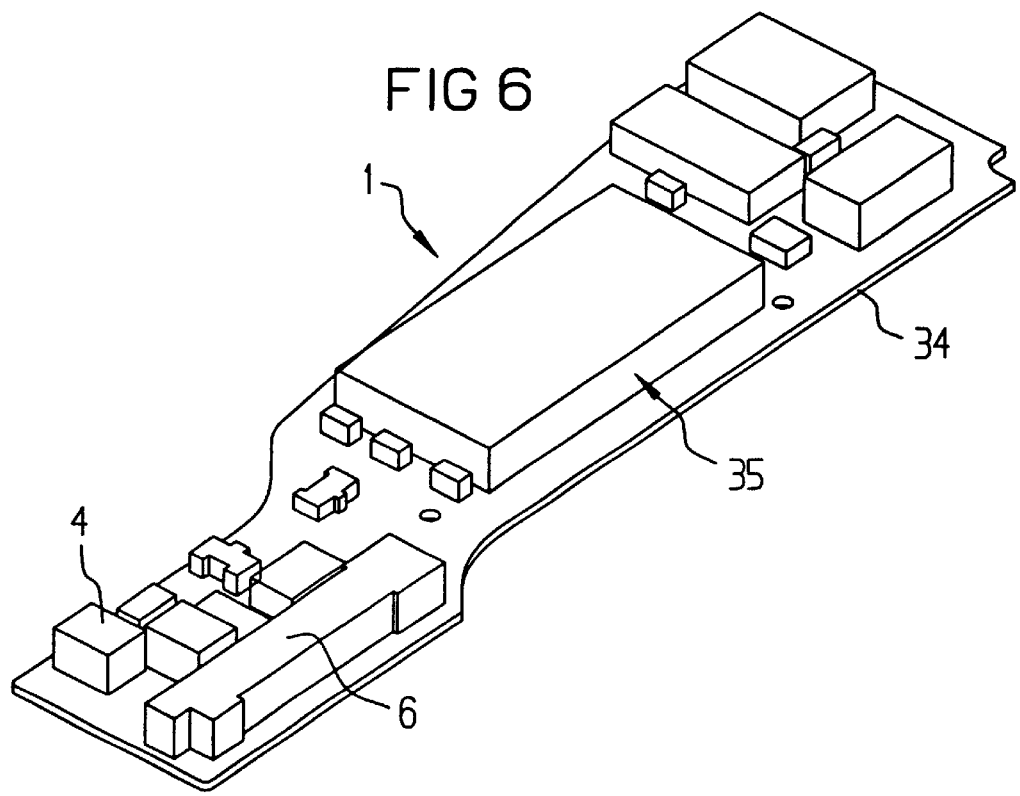
FIG. 6 is a similar view of a second exemplary embodiment.

Two exemplary embodiments for the key 1 of the antitheft protection system are represented in FIGS. 5 and 6. The keys 1 in each case have a printed circuit board 34 on which an electronic circuit 35 is arranged with its diverse components. It will be understood that the printed circuit board 34 can be accommodated in a housing.

The key-side coil 6 and the key-side IR transmitter 4 can likewise be constructed as a mechatronic component. However, in the key 1 the coil 6 can also—as represented in FIG. 6—be disposed separate from the IR transmitter 4 as well as from an optional IR receiver 36. The coil 6 and the IR transmitter 4 are arranged close to one another and as far as possible to the front in the key 1, with the result that—with the key 1 inserted—the transmitting and receiving unit (IR transmitter 4 and coil 6) of the key 1 is disposed as close as possible to the transmitting and receiving unit (coil 10 and IR receiver 9) of the block 7 and aligned therewith (the two transmitting and receiving units, that is to say in each case the two coils 6, 10 as well as, in each case, the IR transmitter 4 and the IR receiver 9 are situated approximately on a line).

The key 1 can preferably be used as an ignition key. In that case, the lock 7 is then a steering and/or ignition lock which is locked and unlocked by the key 1. The key 1 can, moreover, also be a door key.

The IR transmitter 4 on the key 1 can serve not only to transmit the code signal for disengaging the immobilizer 15, but also for locking or unlocking the vehicle doors. For this purpose, the key 1 has a button (not represented) upon the actuation of which the code signal is generated in the electronic circuit 35 of the key 1. If the code signal is emitted with a relatively large range (approx. 10 to 20 m), the central locking of the vehicle can be operated remotely. Likewise, other convenience functions such as opening or closing the windows, opening or closing the sliding roof, switching the heating on or off, etc. can be operated remotely with the key 1.

It is advantageous to use IR signals in the case of the optical transmission of signals. For this purpose, a phototransistor as IR transmitter 4 or 31 emits the optical signal (code signal) which is received by an IR diode as IR receiver 9, 36. The optical signals can also be emitted in the visible region or in the UV region.

Data can also be transmitted between the key 1 and lock 7 in another way, for example in a wireless radio system. An appropriate lock-side receiver is then disposed approximately in the middle inside the lock-side coil 10, the receiver and coil 10 being constructed as a single mechatronic component.

The housing 30 of the component 29 has very small external dimensions. Thus, its diameter can be approximately 8 mm and its length approximately 10 mm. The component 29 can thus be mounted simply in the lock 7.

The transmitting and receiving unit in the lock 7 can be disposed inside a tamperproof housing of the lock 7. The transmitting and receiving unit is thereby protected against unauthorized manipulation.

The transmitting and receiving unit in the key 1 can also be designated as a transponder, since it receives a signal and thereupon automatically answers with the code signal.

The control and evaluation unit 11 and the control unit 2 can be constructed as a microprocessor or as components with the same function.

We claim:

1. An antitheft protection system for a motor vehicle, comprising:

a key having an energy-receiving unit embodied as a first coil and a data-transmitting unit;

a lock having an energy-transmitting unit embodied as a second coil and a data-receiving unit, an evaluation unit connected aid data-receiving unit for checking a data signal received by said data-receiving unit with regard to an authorization and for releasing a locking element if the authorization can be verified;

said second coil and said data-receiving unit of said lock being constructed as a single component disposed substantially centrally in said lock; and said data-receiving unit being disposed inside said second coil; and said key having an end carrying said first coil and said data-transmitting unit of said key, said end being adapted to be inserted into said lock, whereby said first coil and said data-transmitting unit of said key, and said second coil and said data-receiving unit of said lock are disposed in close proximity to one another and approximately aligned with one another.

2. The antitheft protection system according to claim 1, which further comprises a data-receiving unit disposed in said key, and a data-transmitting unit disposed in said lock, and wherein said data-receiving unit in said key and said data-transmitting unit in said lock, together with said data-transmitting unit of said key and said data-receiving unit in said lock, are adapted to carrying out bidirectional data transmission between said key and said lock.

3. The antitheft protection system according to claim 2, wherein said data-transmitting unit in said lock and said energy-transmitting unit and said data-receiving unit are constructed as a single component.

4. The antitheft protection system according to claim 1, wherein the locking element is an electromagnetic locking element for selectively locking and releasing a steering of a motor vehicle.

5. The antitheft protection system according to claim 1, wherein the locking element is an electromagnetic locking element for selectively locking and releasing a steering and for selectively engaging and disengaging an immobilizer of a motor vehicle.

6. The antitheft protection system according to claim 1, wherein the locking element is an electromagnetic locking element for selectively engaging and disengaging an immobilizer of a motor vehicle.

7. The antitheft protection system according to claim 1, wherein said lock is an ignition lock and said key is an electronic ignition key of a motor vehicle.

8. The antitheft protection system according to claim 2, wherein said energy-transmitting unit and said energy-receiving unit each are a coil, said data-transmitting units are phototransistors, and said data-receiving units are IR diodes.

* * * * *